United States Patent Office 3,136,770
Patented June 9, 1964

3,136,770
INDOLYL SUBSTITUTED PIPERIDINES
Allan Poe Gray, Decatur, Ill., assignor to Neisler Laboratories, Inc., Decatur, Ill., a corporation of Delaware
No Drawing. Filed Apr. 1, 1960, Ser. No. 19,157
12 Claims. (Cl. 260—293)

This invention relates to new chemical compounds which are derivatives of indolethylpiperidine type compounds wherein the piperidine moiety is linked to an aryl group by an aliphatic linking chain. Closely related inventions disclosed and claimed herein are concerned with indolylethylpyridine derivatives used as intermediates, and with processes for the preparation of the final products and intermediates.

With reference to the final products, the invention resides in the concept of compositions of matter having a molecular structure in which an indole nucleus is joined, through any available pyrrolo atom thereof, via a 1,2 alkylene bridge to the 4-position of a piperidine or piperideine nucleus, and the nitrogen atom of said piperidine or piperideine nucleus is attached, via a lower-aliphatic linking group, to an aryl nucleus.

Among the compounds of this invention are those represented by the following general formula:

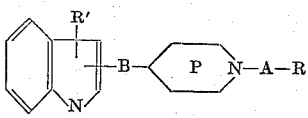

Formula I wherein R′ represents a hydrogen atom or a lower alkyl ($C_{1-5}$) radical; B represents a 1,2-alkylene bridge;

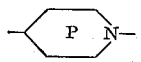

represents a piperidyl radical or a piperideyl radical (a piperidyl radical which is partially unsaturated and contains a single double bond); A is a divalent lower-aliphatic chain attached to the nitrogen atom of the

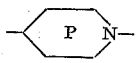

radical by a saturated hydrocarbyl carbon atom of A, wherein A has not more than six atoms in the linking portion of the chain, not more than two of which atoms can be heteroatoms which must be separated from each other by at least two carbon atoms; and R is an aromatic carbocyclic radical containing up to and including ten nuclear atoms.

Again referring to the above Formula I, in the indolyl portion of the molecule the benzo portion thereof can, if desired, be substituted by such common simple substituents as hydroxy; lower alkoxy e.g., 5-methoxy, 6-ethoxy, 5,7-dimethoxy; 5,6-methylenedioxy; loweralkylthio e.g. 5-ethylthio; halo e.g. 5-bromo-, 6-chloro, 7-iodo, 5-fluoro; trifluoromethyl; amino; lower-alkyl; and benzyloxy, and the like. These simple substituents on the benzo portion of the indolyl moiety of the compounds of the present invention do not adversely affect the pharmacological properties thereof, and are to be regarded as the full equivalents of the compounds of the invention wherein the benzo portion of the indolyl radical is unsubstituted. The pyrrolo portion of the indolyl radical, may be lowered-alkyl substituted and is attached to the 1 position of the 1,2-alkylene bridge through any available pyrrolo position of the indolyl radical, and R′ can be in any remaining availably pyrrolo position thereof. The adjacent carbon of the 1,2-alkylene bridge is attached to the 4-position of the piperidine or mono-unsaturated piperidine ring. The 1,2-alkylene bridge may contain a total of 5 carbon atoms. The piperidine or piperideine ring may be loweralkyl substituted (e.g. 2-methyl, 3-ethyl, 5-propyl), at any available ring carbon position, if desired, and when so-substituted, is to be regarded as the full equivalent of the unsubstituted ring, since such lower alkyl substituents do not adversely affect the pharmocological properties of the compound of the present invention. In the above general formula, R is an aromatic carbocyclic radical having up to 10 nuclear carbon atoms e.g. phenyl, naphthyl, and indenyl. This radical may, if desired, be substituted by a simple substituent such as nitro, amino, halo, lower-alkyl, di-loweralkyl, lower-alkoxy, di-lower-alkoxy, trifluoromethyl and phenyl i.e., by the same type of simple common substituents discussed above in connection with the benzo portion of the indole nucleus, and the compounds containing such substituents on R are to be considered the full equivalents of the compounds of the present invention when R is unsubstituted. In the above general formula, A is a divalent lower aliphatic chain attached to the nitrogen atom of the

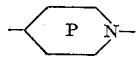

radical by a saturated hydrocarbyl carbon atom of A, wherein A has not more than six atoms in the linking portion of the chain, up to two of which atoms can be heteroatoms such as oxygen and sulfur, and wherein any two heteroatoms in the linking portion of the chain must be separated from each other by at least two carbon atoms. Thus A includes such linking chains as alkylene, oxa-alkylene, thia-alkylene and alkenylene. A may be unsubstituted or substituted with simple substituents such as hydroxy, lower alkyl, lower alkoxy, acetoxy, trifluoromethyl, oxo and carbamyloxy. A may contain a total of 10 atoms (counting carbon and heteroatoms but not counting hydrogen atoms) although only six atoms will be in the chain portion thereof.

It will be apparent that the definition of A–R (referring to the above general formula) is intended to include, specifically or as equivalents, such representative radicals as benzyl, phenethyl, β-hydroxyphenethyl, phenoxyethyl, 3-phenoxy-2-hydroxypropyl, p-nitrophenethyl, p-aminophenethyl, cinnamyl, 4-chlorophenethyl, α-(3-bromophenyl) - propyl, γ - (o - tolyloxy) - propyl, phenyl-thioethyl, 3,4-dimethoxyphenoxyethoxyethyl, β-(3,4,5-tri-methoxyphenyl)-butyl, γ-(3-hydroxyphenyl)-propyl, 3-hydroxyphenethyl, γ-phenyl-β,β-dimethylpropyl, γ-(4-ethylthiophenyl) - β - hexyl, α - (1 - naphthyl) - β-propyl, 3-idenylethyl, γ(2,4-dimethylphenyl)-propyl, 4-fluorophenethyl, 4-trifluoromethylphenethyl, phenacyl, p-phenylbenzyl and phenylpropynyl.

The above general formula defines the compounds of the present invention as the free base form thereof. The physical embodiments of the inventive concept have pharmacological utility, as will be discussed later in more detail. For such use the compounds will be administered in the form of their pharmaceutically acceptable acid addition salts, and these salts are the full equivalents of the free base forms thereof.

The preferred compounds of the present invention are those wherein, referring to the above general formula, β is a 1,2-ethylene bridge and one end of the 1,2-ethylene bridge is attached to the 3-position of the indolyl moiety; and the indole nitrogen is unsubstituted or methyl substituted; R is phenyl or substituted phenyl; and A contains not more than three chain atoms.

The compounds of the present invention, in free base form generally are crystalline solids melting at moderate temperatures or oils, and when in salt form are high melting crystalline solids.

The physical embodiments of the inventive concept can be prepared as illustrated by the following schematic equations, wherein R, R', A, and B have the meaning given above with reference to general Formula I.

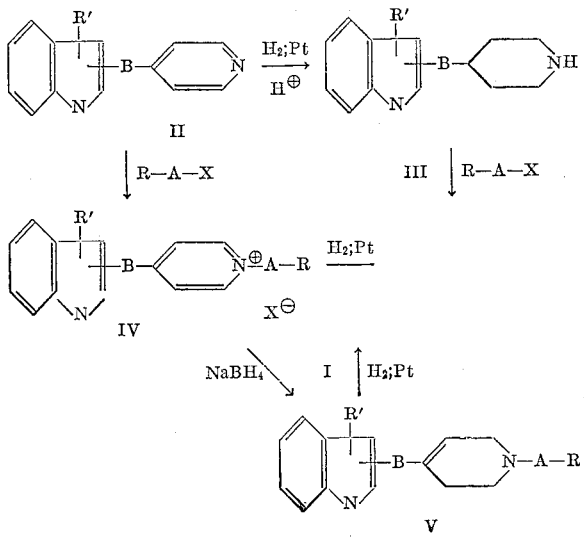

Hydrogenation under acid conditions of a suitable 4-(indolylalkyl)pyridine, Formula II, prepared as disclosed in my copending application together with C. J. Cavallito, S.N. 846,810 filed October 16, 1959 over a platinum, palladium or similar suitable catalyst give the corresponding piperidine, Formula III. The piperidine can be alkylated with the desired alkylating agent, R-A-X, wherein X can represent a chlorine, bromine or iodine atom, or a toluenesulfonate or like group, in the presence of at least one equivalent of a basic reagent capable of neutralizing the acid produced in the process, to obtain products of this invention, which are represented by general Formula I.

The piperidine, represented by Formula III, can also be reacted with a substituted ethylene oxide to obtain products of this invention, Formula I.

Alternatively, the compounds of this invention can be prepared by the quaternization of a suitable 4-(indolylalkyl)-pyridine, Formula II, with an alkylating agent, R-A-X, as previously defined, followed by hydrogenation of the resulting pyridinium salt, Formula IV, over a platinum, nickel or similar suitable catalyst to yield the products of this invention, Formula I.

$\Delta^{3,4}$-piperideine products of the invention, Formula V, can be obtained by the sodium borohydride reduction of the desired pyridinium salt, Formula IV.

Alternatively, the $\Delta^{3,4}$-piperideine derivative, Formula V, can be catalytically hydrogenated to obtain piperidine products of the invention, Formula I.

The acid addition salts of the invention can be prepared in conventional manner by reacting an indole derivative of the invention with the usual inorganic acids, as, for example, hydrochloric, hydrobromic, hydriodic, sulfuric, and phosphoric; or an organic acid as, for example, acetic, tannic, citric, salicyclic, et cetera. The anions of the acid addition salts can be exchanged for different anions, where desired, by conventional techniques.

Intermediates useful in preparing the compounds of Formula I can be prepared as follows:

PREPARATIONS

*Preparation 1.—4-(3-Indolylethyl)-Piperidine*

A solution of 53.0 g. (0.24 mole) of 4-(3-indolylethyl)-pyridine in 200 ml. of glacial acetic acid was hydrogenated over 1.2 g. of platinum oxide (Adams catalyst) at room temperature and 50 p.s.i. in an Adams-Parr apparatus. Hydrogen absorption was slow, the calculated amount being absorbed in 45 hours. The filtered solution was concentrated in vacuo to a thick, red oil which was taken up in water containing a little added hydrochloric acid. The aqueous solution was washed with ether and made alkaline to precipitate and oil which solidified to a tan solid. This was charcoaled and recrystallized from isopropyl alcohol to give a total of 37.7 g. (69 percent) of 4-(3-indolylethyl)-piperidine as off-white crystals, M.P. 162–163 degrees centigrade.

*Analysis.*—Calculated for $C_{15}H_{20}N_2$: N(basic), 6.14. Found: 6.03.

Treatment of an ethanol solution of the base with excess ethereal hydrogen chloride and recrystallization of the resultant precipitate from methanol afforded 4-(3-indolylethyl)-piperidine hydrochloride as light tan, falt rhombs, M.P. 213–215 degrees centigrade. (With decomposition).

*Analysis.*—Calculated for $C_{15}H_{21}ClN_2$: C, 68.04; H, 8.00; Cl, 13.39. Found: 68.22 8.05 13.47.

*Preparation 2.—4-(3-Indolylethyl)-Piperidine*

When a solution of 44.5 g. (0.2 mole) of 4-(3-indolylethyl)-pyridine in a mixture of 100 ml. of water, 80 ml. of ethanol and 20 ml. of concentrated hydrochloric acid was shaken in an Adams-Parr apparatus with 1.0 g. of platinum oxide at room temperature and 50 p.s.i., hydrogen absorption was complete in 20 hours. The filtered solution was diluted with a large volume of water, made basic with aqueous ammonia and the precipitate charcoaled and recrystallized from isopropyl alcohol to yield 29 g. (63 percent) of 4-(3-indolylethyl)-piperidine, identical with the product described in Preparation 1.

*Preparation 3.—4-(1-Methyl-3-Indolylethyl)-Piperidine*

In a manner similar to that described in Preparation 1, 4-(1-methyl-3-indolylethyl)-pyridine was hydrogenated to provide, after recrystallization from Skellysolve B, a 57 percent yield of 4-(1-methyl-3-indolylethyl)-piperidine, M.P. 65–66 degrees centigrade.

*Analysis.*—Calculated for $C_{16}H_{22}$: N(basic), 5.78. Found: 5.78.

4 - (1-methyl-3-indolylethyl)-piperidine hydrochloride, recrystallized from isopropyl alcohol-ether, showed M.P. 200–201 degrees centigrade.

*Analysis.*—Calculated for $C_{16}H_{23}ClN_2$: C, 68.92; H, 8.32; Cl, 12.72. Found 68.79; 8.25; 12.70.

Physical embodiments of the inventive concept can be prepared as shown in the following examples, which are to be regarded as illustrative and not as limiting:

EXAMPLES

*Example 1.—4-(3-Indolylethyl)-1-Phenethylpiperidine*

To a mixture of 125 g. (0.55 mole) of the product described in Preparation 2, 150 g. (1.2 moles) of sodium carbonate (monohydrate) and 750 ml. of isopropyl alcohol, stirred and heated to reflux, was added dropwise, a solution of 102 g. (0.55 mole) of phenethyl bromiue in 125 ml. of isopropyl alcohol. The reaction mixture was stirred and heated for an additional 16 hours, filtered while hot, the filtrate concentrated to a smaller volume and cooled in an ice-bath to give a crystalline precipitate. Recrystallization from ethanol afforded a yield of 148 g. (81 percent) of 4-(3-indolylethyl)-1-phenethylpiperidine which showed M.P. 129–130 degrees centigrade.

*Analysis.*—Calculated for $C_{23}H_{28}N_2$: N(basic), 4.21. Found: 4.22.

Treatment of an ethanol-ether solution of the base with excess ethereal hydrogen chloride and recrystallization of the precipitate from isopropyl alcohol gave 4-(3-indolylethyl)-1-phenethylpiperidine hydrochloride in the form of colorless crystals, M.P. 225–226 degrees centigrade. (With decomposition).

*Analysis.*—Calculated for $C_{23}H_{29}ClN_2$: C, 74.87; H, 7.92; Cl, 9.61. Found: 75.00; 8.17; 9.66.

Treatment of an isopropyl alcohol solution of the base with excess methyl bromide and recrystallization of the product from ethanol yielded 4-(3-indolylethyl)-1-phenethly-piperidine methobromide as colorless crystals, M.P. 233-234 degrees centigrade (with decomposition).

*Analysis.*—Calculated for $C_{24}H_{31}BrN_2$: C, 67.44; H, 7.31; Br, 18.70. Found: 67.64; 7.33; 18.57.

Treatment at room temperature of 10.0 g. (.03 mole) of the base dissolved in 100 milliliters of ethanol with 3.6 g. (.06 mole) of acetic acid gave, after concentration to dryness, a residue. The residue was crystallized from ethyl acetate-methanol solution and recrystallized from isopropyl alcohol to yield 8.0 g. of 4-(3-indolylethyl)-1-phenethyl-piperidine acetate, M.P. 122-125 degrees centigrade.

*Analysis.*—Calculated for $C_{25}H_{32}N_2O_2$: Neutral Equivalent: 392.5. Found: 392.0.

Treatment of 10.0 g. (.03 mole) of the base dissolved in hot dimethyl cellosolve, with 5.9 g. (.06 mole) of sulfuric acid gave a precipitate which was recrystallized from isopropyl alcohol to yield 5 grams of 4-(3-indolylethyl)-1-phenethylpiperidine sulfate.

Treatment of 10.0 g. (.03 mole) of the base dissolved in 100 milliliters of ethanol with an ethanol solution of excess maleic acid gave after concentration to dryness a residue. The residue was reprecipitated from ethyl acetate-methanol solution to give 4-(3-indolylethyl)-1-phenethylpiperidine maleate as an oil which dried to a solid, M.P. 103-106 degrees centigrade.

*Analysis.* — Calculated for $C_{27}H_{32}N_3O_4$: Neutral Equivalent (with acid, 448.5; Neutral Equivalent (with base), 224.3. Found: Neutral Equivalent (with acid), 449.0; Neutral Equivalent (with base), 222.7.

Treatment of 10.0 g. (.03 mole) of the base dissolved in 100 milliliters of ethanol with an ethanol solution of 11.5 grams of citric acid and concentration to dryness grave a residue. The residue was reprecipitated from ethyl acetate-methanol to give 4-(3-indolylethyl)-1-phenethylpiperidine citrate as an oil which was dried to a low melting solid.

*Example 2.*—A. *4-(3-Indolylethyl)-1-Phenethylpyridinium Bromide*

A solution of 235 g. (1.05 moles) of 4-(3-indolylethyl)-pyridine and 226 g. (1.2 moles) of phenethyl bromide in 1 liter of acetonitrile was heated at reflux on a steam-bath for 8 hours. The oil precipitate, which crystallized on cooling, was recrystallized from isopropyl alcohol to yield 345 g. (81 percent) of 4-(3-indolylethyl)-1-phenethylpyridinium bromide, M.P. 157-157.5 degrees centigrade.

*Analysis.*—Calculated for $C_{23}H_{23}BrN_2$: C, 67.81; H, 5.69; Br, 19.62. Found: 67.42; 5.86; 19.59.

B. *4-(3-Indolylethyl)-1-Phenethylpiperidine*

A solution of 102 g. (0.25 mole) of the product described in Example 2A in 1 liter of 75 percent methanol was stirred with 2.5 g. of platinum oxide at 65 degrees centigrade and a hydrogen pressure of 400 p.s.i. in a 2 liter Magne Dash autoclave. Absorption of hydrogen was complete in 6-8 hours. The hot mixture was filtered and the catalyst thoroughly washed with hot methanol. The combined filtrates were diluted with water, treated with aqueous ammonia, and the precipitate was recrystallized from ethanol to yield 73 g. (88 percent) of 4-(3-indolylethyl)-1-phenethylpiperidine, M.P. 130-132 degrees centigrade. The melting point of a mixture with the product obtained in Example 1 was not depressed.

4-(3-indolylethyl)-1-phenethylpiperidine hydrochloride, recrystallized from methanol, melted at 225-226 degrees centigrade.

*Analysis.*—Calculated for $C_{23}H_{29}ClN_2$: Cl, 9.61. Found: 9.64.

*Example 3.*—*4-(3-Indolylethyl)-1-(p-Nitrophenethyl)-Piperidine*

To a mixture of 22.8 g. (0.1 mole) of the product described in Preparation 1, and 32 g. (0.3 mole) of anhydrous sodium carbonate in 150 ml. of isopropyl alcohol, stirred and heated to reflux on a steam-bath, was added, dropwise, a solution of 23.0 g. (0.1 mole) of p-nitrophenethyl bromide in 100 ml. of isopropyl alcohol. Stirring and heating were continued for 21 hours. The reaction mixture was diluted with water and the resultant precipitate was recrystallized from chloroform-Skellysolve B to give 23.4 g. (64 percent) of 4-(3-indolylethyl)-1-(p-nitrophenethyl)-piperidine in the form of crystals, M.P. 173-175 degrees C.

*Analysis.*—Calculated for $C_{23}H_{27}N_3O_2$: N(basic), 3.71. Found: 3.70.

4 - (3 - indolylethyl) - 1 - (p - nitrophenethyl) - piperidine hydrochloride, recrystallized from isopropyl alcohol-ether, formed pale yellow crystals, melting with decomposition at 254-255 degrees centigrade.

*Analysis.*—Calculated for $C_{23}H_{28}ClN_3O_2$: C, 66.73; H, 6.82; Cl, 8.57. Found: 66.54; 6.79; 8.41.

*Example 4.*—*4-(3-Indolylethyl)-1-Benzylpiperidine*

A mixture of 11.4 g. (0.05 mole) of the product described in Preparation 1, 17.0 g. (0.1 mole) of potassium carbonate monohydrate and 250 ml. of toluene was heated at reflux in an oil-bath and 6.4 g. (0.05 mole) of benzyl chloride added, dropwise with stirring. Stirring was continued and the reaction mixture was heated for 24 hours. The cooled mixture was diluted with ether, washed with water and extracted with 10 percent hydrochloric acid. The acid extract was made alkaline and extracted with benzene. Drying and removal of the solvent and crystallization of the residue from Skellysolve B yielded 11.2 g. (66 percent) of 4-(3-indolylethyl)-1-benzylpiperidine, M.P. 91.92 degrees centigrade.

*Analysis.*—Calculated for $C_{22}H_{26}N_2$: N(basic) 4.40. Found: 4:38.

4-(3-indolylethyl)-1 - benzylpiperidine hydrochloride, recrystallized from ethanol, melted at 192-193 degrees centigrade.

*Analysis.*—Calculated for $C_{22}H_{27}ClN_2$: C, 74.44; H, 7.67; Cl, 9.99. Found: 73.91; 7.69; 9.84.

*Example 5.*—*4-(3-Indolylethyl)-1-(p-Aminophenethyl)-Piperidine*

An exothermic reaction and vigorous evolution of gas took place when a rapidly stirred solution of 10.0 g. (0.026 mole) of the product described in Example 3 and 5.0 g. of 85 percent hydrazine hydrate (0.085 mole) in 200 ml. of ethanol was treated with approximately 2 g. of Raney nickel and warmed gently on a steam-bath. The steam-bath was removed and the rate of gas evolution controlled by ice-cooling of the reaction flask. At the end of 5 minutes the initial reaction had subsided and the reaction mixture was heated under reflux with stirring for 5 hours. Concentration of the filtered solution under reduced pressure left a residue which was extracted with hot benzene. The benzene solution was diluted with ether and treated with ethereal hydrogen chloride. Recrystallization of the precipitate from methanol-ethyl acetate afforded 5.8 g. of 4-(3-indolylethyl)-1-(p-aminophenethyl)-piperidine dihydrochloride, melting with decomposition at 293 degrees centigrade.

*Analysis.*—Calculated for $C_{23}H_{31}Cl_2N_3$: C, 65.70; H, 7.43; Cl, 16.87. Found: 65.94; 7.24; 16.57.

*Example 6.*—*4-(3-Indolylethyl)-1-(β-Hydroxyphenethyl)-Piperidine*

A mixture of 11.4 g. (0.05 mole) of the product described in Preparation 2, and 6.0 g. (0.05 mole) of styrene oxide was heated in an oil bath at a bath temperature of 150 degrees centigrade for 7 hours. The cooled melt was crystallized from ethanol to yield 10.0 g. (58 percent of 4-(3-indolylethyl)-1-(β-hydroxyphenethyl)-piperidine, M.P. 133–135 degrees centigrade.

*Analysis.*—Calculated for $C_{23}H_{28}N_2O$: N (basic), 4.02. Found: 3.99.

4-(3-indolylethyl)-1-(β-hydroxyphenethyl) - piperidine hydrochloride, recrystallized from ethanol-ether, showed M.P. 193–194 degrees centigrade.

*Analysis.*—Calculated for $C_{23}H_{29}ClN_2O$: C, 71.76; H, 7.59; Cl, 9.21. Found: 71.65; 7.88; 9.22.

*Example 7.—4-(3-Indolylethyl)-1-Phenethyl-$\Delta^{3,4}$-Piperideine*

To a stirred solution of 20.0 grams (0.05 mole) of the product described in Example 2A dissolved in 200 ml. of methanol was added, dropwise at a rate sufficient to maintain gentle reflux, a solution of 15.2 g. (0.4 mole) of sodium borohydride in 100 ml. of methanol. After the addition was complete the solution was refluxed on a steam-bath for 2 hours, concentrated to about one-half its volume and cooled to yield a crystalline precipitate. This was thoroughly washed with water and recrystallized from benzene-Skellysolve B to provide 12.6 g. (76 percent yield) of 4-(3-indolylethyl)-1-phenethyl-$\Delta^{3,4}$-piperideine in the form of colorless crystals, M.P. 132–133 degrees centigrade. The melting point of a mixture with the product of Example 1 was depressed to 118–119 degrees.

*Analysis.*—Calculated for $C_{23}H_{26}N_2$: N(basic), 4.24. Found: 4.18.

Treatment of an ether solution of the base with excess ethereal hydrogen chloride yielded 4-(3-indolylethyl)-1-phenethyl-$\Delta^{3,4}$-piperideine hydrochloride as a crystalline solid, M.P. 179–180 degrees centigrade.

*Analysis.*—Calculated for $C_{23}H_{27}ClN_2$: C, 75.28; H, 7.42; Cl, 9.66. Found: 75.33; 7.55; 9.61.

*Example 8.—4-(3-Indolylethyl)-1-Phenacylpiperidine*

To a stirred, refluxing mixture of 22.8 g. (0.1 mole) of 4-(3-indolylethyl)-piperidine, 33.0 g. (0.2 mole) of hydrated potassium carbonate and 150 ml. of toluene was added, dropwise over a period of one hour, a solution of 15.5 grams (0.1 mole) of phenacyl chloride in 50 ml. of toluene. Refluxing was continued for a period of 8 hours. The reaction mixture was diluted with 500 ml. of hot benzene and filtered. Upon cooling crystals formed and recrystallization from benzene gave 23.0 g. (70 percent yield) of 4-(3-indolylethyl)-1-phenacyl piperidine as white flakes, M.P. 173–174 degrees centigrade.

*Analysis.*—Calculated for $C_{23}H_{26}N_2O$: N(basic), 4.04. Found: 4.05.

Treatment of a chloroform solution of the base with excess ethereal hydrogen chloride formed a precipitate. Recrystallization from a methanol-ether solution yielded tan crystals of 4-(3-indolylethyl)-1-phenacylpiperidine hydrochloride, M.P. 235–236 degrees centigrade.

*Analysis.*—Calculated for $C_{23}H_{27}ClN_2O$: C, 72.14; H, 7.11; Cl, 9.26. Found: 71.68, 7.23; 9.16.

The following examples, in tabular form, follow the general procedures of the previous examples.

TABLE I

| Example | Compound | Method (Example) | M.P., °C. | Formula | Calculated | | | | Found | | | |
|---|---|---|---|---|---|---|---|---|---|---|---|---|
| | | | | | C | H | Hal. | N (basic) | C | H | Hal. | N (basic) |
| 9A | 4-(3-indolylethyl)-1-(phenoxyethyl)-pyridinium bromide. | 2A | 149–151 | $C_{23}H_{23}BrN_2O$ | 65.25 | 5.48 | 18.88 | | 65.66 | 5.81 | 18.64 | |
| 9B | 4-(3-indolylethyl)-1-phenoxy-ethyl)-piperidine. | 2B | 102–103 | $C_{23}H_{28}N_2O$ | | | | 4.02 | | | | 3.99 |
| | Hydrochloride salt | | 170 | $C_{23}H_{29}ClN_2O$ | 71.75 | 7.59 | 9.21 | | 72.13 | 7.75 | 9.20 | |
| | Methobromide salt | | 206–208 | $C_{24}H_{31}BrN_2O$ | 65.00 | 7.05 | 18.02 | | 65.33 | 7.16 | 17.93 | |
| 10 | 4-(3-indolylethyl)-1-(3-phenoxy-2-hydroxy-propyl)-piperidine. | 6 | 96–97 | $C_{24}H_{30}N_2O_2$ | | | | 3.74 | | | | 3.67 |
| | Hydrochloride salt | | 196–197 | $C_{24}H_{31}ClN_2O_2$ | 69.46 | 7.53 | 8.55 | | 69.00 | 7.65 | 8.37 | |
| 11 | 4-(3-indolylethyl)-1-cinnamyl-piperidine. | 4 | 129–131 | $C_{24}H_{28}N_2$ | 83.67 | 8.19 | | 4.07 | 83.46 | 8.21 | | 3.99 |
| 12 | 4-(1-methyl-3-indolylethyl)-1-phenethyl-piperidine. | 3 | Oil | | | | | | | | | |
| | Hydrochloride salt | | 201–202 | $C_{24}H_{31}ClN_2$ | 75.26 | 8.16 | 9.26 | | 75.11 | 7.97 | 9.22 | |
| 13 | 4-(1-methyl-3-indolylethyl)-1-(β-hydroxy-phenethyl)-piperidine. | 6 | Oil | | | | | | | | | |
| | Hydrochloride Salt | | 193–195 | $C_{24}H_{31}ClN_2O$ | 72.25 | 7.83 | 8.89 | | 72.20 | 8.19 | 8.79 | |
| 14A | 4-(1-indolylethyl)-1-phenethyl-pyridinium bromide. | 2A | 151–153 | $C_{23}H_{23}BrN_2$ | 67.81 | 5.69 | 19.62 | | 68.08 | 5.68 | 19.60 | |
| 14B | 4-(1-indolylethyl)-1-phenethyl-piperidine. | 2B | Oil | | | | | | | | | |
| | Hydrochloride salt | | 161–166 | $C_{23}H_{29}ClN_2$ | 74.87 | 7.92 | 9.61 | | 74.76 | 7.85 | 9.55 | |

The physical embodiments of the inventive concept have been evaluated by standard pharmacological testing procedures and have been shown to process analgesic and central depressant activities in living animals; some also demonstrate significant vasodilator activities. Certain embodiments of the inventive concept have been found to be highly potent analgesic agents, for example, 4-(3-indolylethyl)-1-phenethylpiperidine (Example 1); 4-(3-indolylethyl)-1-phenethyl-$\Delta^{3,4}$-piperideine (Example 7); and 4-(3-indolylethyl) - 1 - phenacylpiperidine (Example 8), compare with morphine in analgesic activity and have a longer duration of action when tested by standard pharmacological testing procedures in living animals. This high analgesic activity is unusual in that these compounds appear to lack certain of the structural features which are generally considered essential to potent analgesic activity.

The invention can be embodied in other specific forms without departing from the spirit or essential characteristics thereof. The foregoing physical embodiments are, therefore, to be considered in all respects illustrative and not restrictive, the scope of the invention being indicated by the appended claims rather than by the foregoing description, and all changes which come within the meaning and range of equivalents of the claims are, therefore, intended to be embodied therein.

I claim:

1. A compound selected from the group consisting of (I) compounds of the formula

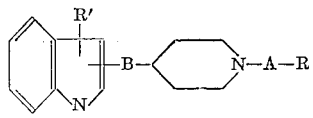

wherein R' is a pyrrolo substituent selected from the group consisting of hydrogen and lower alkyl of from 1 to 5 carbon atoms; B is 1,2-lower-alkylene of up to 5 carbon atoms; A is a divalent aliphatic chain containing a total of up to 10 carbon and hetero atoms, up to 6 of which atoms are in the linking portion of the chain with no more than 2 of the 6 linking atoms being hetero atoms which are always separated from each other by at least two carbon atoms, which hetero atoms are selected from the group consisting of oxygen and sulphur, any substituent on A being selected from the group consisting of hydroxy, lower-alkyl, lower alkoxy, acetoxy, trifluoromethyl, oxo and carbamyloxy; and R is aromatic carbocyclic containing a total of up to 10 nuclear carbon atoms; and (II) pharmaceutically acceptable acid addition salts of (I).

2. 4-(indolylethyl) - 1 - (phenylloweralkyl)piperidine wherein the ethyl group is attached to the pyrrolo portion of the indolyl group and loweralkyl contains a total of up to 6 carbon atoms in the linking portion thereof.

3. 4-(indolylethyl) - 1 - (phenoxyloweralkyl)piperidine wherein the ethyl group is attached to the pyrrolo portion of the indolyl group and loweralkyl contains a total of up to 6 carbon atoms in the linking portion thereof.

4. 4-(indolylethyl)-1-(phenyl-beta-hydroxyloweralkyl)-piperidine, wherein the loweralkyl group contains not more than 6 carbon atoms in the linking portion of the loweralkyl group, wherein the ethyl group is attached to the pyrrolo portion of the indolyl group.

5. 4-(indolylethyl) - 1 - (phenoxy-beta-hydroxyloweralkyl)piperidine, wherein the loweralkyl group contains not more than 6 carbon atoms in the linking portion of the loweralkyl group, wherein the ethyl group is attached to the pyrrolo portion of the indolyl group.

6. 4 - (indolylethyl)-1-(benzoyl-loweralkyl)piperidine, wherein the loweralkyl group contains not more than 6 carbon atoms in the linking portion of the loweralkyl group, wherein the ethyl group is attached to the pyrrolo portion of the indolyl group.

7. 4-(3-indolylethyl)-1-phenethylpiperidine.

8. 4-(3-indolylethyl)-1-β-hydroxyphenethylpiperidine.

9. 4-(3-indolylethyl)-1-benzylpiperidine.

10. 4-(3-indolylethyl) - 1 - (p-aminophenethyl)-piperidine.

11. 4-(1-methyl-3-indolylethyl)-1-phenethylpiperidine.

12. 4-(3-indolylethyl)-1-phenacylpiperidine.

References Cited in the file of this patent

UNITED STATES PATENTS

| | | |
|---|---|---|
| 2,695,290 | Finkelstein et al. | Nov. 23, 1954 |
| 2,773,875 | Finkelstein et al. | Dec. 11, 1956 |
| 2,784,195 | Burtner | Mar. 5, 1957 |
| 2,814,625 | Speeter | Nov. 26, 1957 |
| 2,872,453 | Jacob et al. | Feb. 3, 1959 |

FOREIGN PATENTS

| | | |
|---|---|---|
| 553,409 | Belgium | June 14, 1957 |
| 804,786 | Great Britain | Nov. 26, 1958 |
| 1,071,198 | France | Mar. 3, 1954 |

OTHER REFERENCES

Gray: Journal of Organic Chemistry, vol. 23: pages 1453 and 1454 (1958), QD 241 J6.

UNITED STATES PATENT OFFICE
CERTIFICATE OF CORRECTION

Patent No. 3,136,770                          June 9, 1964

Allan Poe Gray

It is hereby certified that error appears in the above numbered patent requiring correction and that the said Letters Patent should read as corrected below.

In the grant (only), line 1, for "Allan Pie Gray" read -- Allan Poe Gray --; column 1, line 70, for "availably" read -- available --; column 5, line 30, for "$C_{27}H_{32}N_3O_4$" read -- $C_{27}H_{32}N_2O_4$ --; line 37, for "grave" read -- gave --; column 6, line 37, for "91.92" read -- 91-92 --; line 39, for "4:38" read -- 4.38 --.

Signed and sealed this 27th day of October 1964.

(SEAL)
Attest:

ERNEST W. SWIDER
Attesting Officer

EDWARD J. BRENNER
Commissioner of Patents